UNITED STATES PATENT OFFICE.

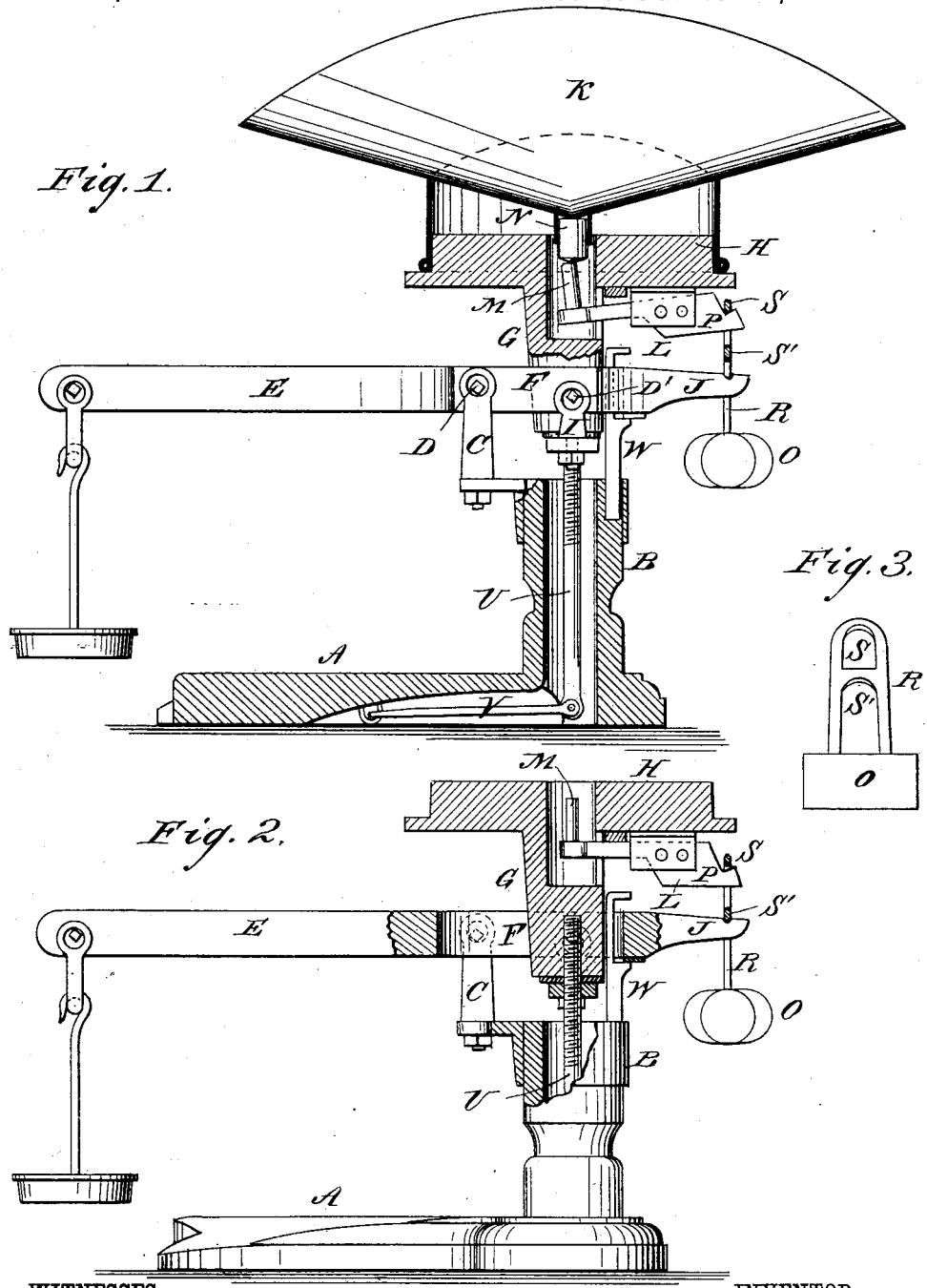

ASA LEAS, OF WEST MANCHESTER, OHIO.

SCOOP BALANCE ATTACHMENT FOR WEIGHING-SCALES.

SPECIFICATION forming part of Letters Patent No. 330,595, dated November 17, 1885.

Application filed June 20, 1885. Serial No. 169,308. (Model.)

*To all whom it may concern:*

Be it known that I, ASA LEAS, of West Manchester, in the county of Preble and State of Ohio, have invented a certain new and useful Improvement in Scoop Balance Attachments for Weighing-Scales, of which the following is a full, clear, and exact description.

This invention relates to a scoop balance attachment to a weighing-scale to automatically compensate so that articles may be weighed in the scoop in the usual manner or upon the platform without balancing the scale by adding the weight of the removed scoop thereto.

Reference is to be had to the accompanying drawings, forming part of this specification, in which similar letters of reference indicate corresponding parts in all the figures.

Figure 1 represents a vertical central section of a weighing-scale with my scoop balance attachment applied thereto with the weighing-beam and scoop in elevation; Fig. 2, a similar section to Fig. 1, showing the scoop removed and the scale still balanced automatically to weigh articles placed upon the platform thereof instead of in the scoop; Fig. 3, a side elevation of a double-looped balancing-weight which is suspended alternately to balance the scale by an upper and lower notch therein, to be hereinafter described.

A in the accompanying drawings represents the base of a weighing-scale, having a standard, B, erected thereon in the usual manner, and upon which is mounted the weighing mechanism, to be hereinafter described.

To the upper end of the standard B is secured a stud, C, in which the weighing-beam E is pivoted at D. One end of this beam E is formed into a yoke, F, to surround and through which the stem G of the platform H projects downward, to be supported upon pivots D' in studs I, secured to said stem G on either side of the yoke, and arranged centrally with the standard B. This yoke F extends beyond the standard B and terminates in an end provided with a notch, J, at the proper distance from the weighing-fulcrum D to receive thereon the loop R of a balancing-weight, O, to balance the scale when the scoop K is removed therefrom, as in Fig. 2. In Fig. 1 the scoop K is placed upon the platform H, and the balancing-weight O rests in a notch, P, in the lever L, pivoted to the lower side of the platform H. In Fig. 2 the scoop K is removed, and the balancing-weight O is suspended from a notch, J, in the end of the yoke E. In order to effect this change from one notch to the other automatically to maintain the scale balanced for use, a lever, L, is pivoted to the lower side of the platform H, one end of which extends to the center of the stem G thereof, and from which projects upward a stud, M, bearing against a stem, N, extending downward from the lower side of the scoop K to meet it, so that when the scoop K is placed upon the platform H its weight will raise the balancing-poise O out of the notch J in the end of the yoke F, and thus transfer the balancing-weight O from the notch J in the yoke end of the weighing-beam E to the notch P in the lever L, as shown in Fig. 1; and when articles are to be weighed upon the platform H the scoop K is removed therefrom and the lever L drops down, so as to transfer the weight O from the notch P therein to the notch J in the end of the yoke F, thus automatically transferring the balancing of the scale from the intermediate lever, L, to the extended yoke end of the weighing-beam E, as in Fig. 2. That the balancing-weight O may be transferred automatically from the notch J in the yoke E to the notch P in the lever L, and from the notch P back to the notch J alternately from one to the other, as the scale is used either with or without the scoop K, the balancing-weight O is provided with a loop, R, having two notches, S S', one above the other, as represented in Fig. 3, so that when the scoop K is placed upon the platform H its weight, by means of the lever L, will raise the notch S' of the balancing-weight O out of the notch J in the end of the yoke, and thus transfer the balancing of the scale from the notch J in the yoke end of the weighing-beam to the lever L, as in Fig. 1; and when the scoop K is removed from the platform H and the lever L relieved from its weight it will drop down and the notch S' of the balancing-poise will rest in the notch J in the end of the yoke, and thereby transfer the balancing of the scale from the lever L to the yoke end F of the weighing-beam E. To maintain the stem G perpendicular and retain it upon its pivots D', a rod, U, extends downward through the hollow center of the standard B, and a lock-bar, V, is jointed thereto and its opposite end pivoted to the lower side of the base A, as shown in sectional view, Fig. 1. To govern the up-and-down movement of the yoke F of the weighing-beam, a stop, W, is provided with hooks thereon, between which the yoke may vibrate a given distance, as required.

The operation of this weighing-scale with my automatic scoop balance attachment applied thereto may be briefly recapitulated as follows: When the scoop K is used, the balancing-weight O is suspended from the lever L, which compensates for the weight of the scoop to maintain the scale balanced; and when the scoop K is removed from the platform H and the lever L relieved from its weight the lever drops down, and the balancing-weight O is then suspended from the yoke end of the weighing-beam, having been transferred from one lever to the other by the movement of the lever L. Thus the balancing-weight O is automatically transferred from one lever to the other alternately back and forth to maintain the scale balanced for use with or without the scoop K, as described.

Having thus described my invention, I claim as new and desire to secure by Letters Patent—

1. In a weighing-scale, in combination with the standard B, beam E, platform H, scoop K, and pivots D D', the hinged lever L, and balancing-weight O, provided with a double loop, R, constructed and operating so as to automatically balance the scale with or without the scoop, substantially as described.

2. In a weighing-scale, in combination with the beam E, platform H, scoop K, and standard B, the extended yoke F, and lever L, constructed so that the notches J P, respectively, therein may be in such relative position one above the other as to engage alternately with the loops S S' of the balancing-weight O to automatically balance the scale either with or without the scoop, as described.

ASA LEAS.

Witnesses:
I. ELMORE LEAS,
C. T. BOWER.